Nov. 25, 1924.　　　DE WITT C. HARRIS　　　1,516,920
TYPEWRITER
Filed March 8, 1922　　　12 Sheets-Sheet 1

Nov. 25, 1924.  1,516,920
DE WITT C. HARRIS
TYPEWRITER
Filed March 8, 1922    12 Sheets-Sheet 7
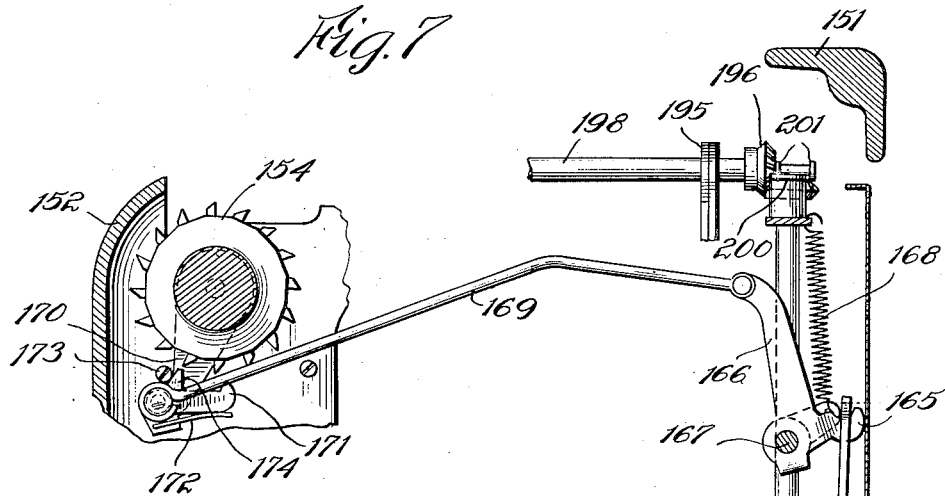
Fig. 7
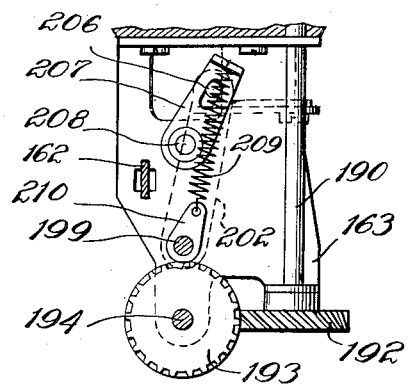
Fig. 8
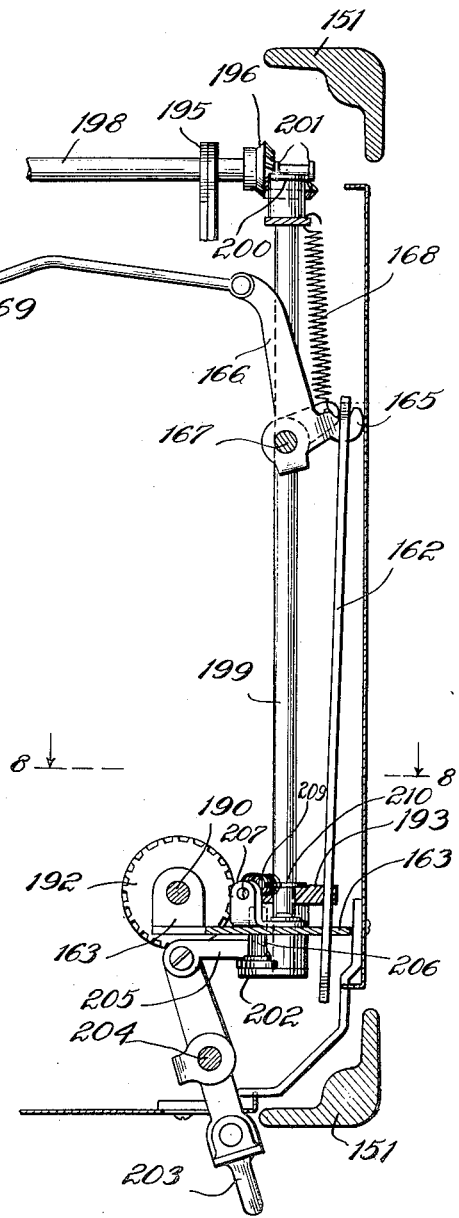
Inventor
DeWitt C. Harris Nov. 25, 1924.
DE WITT C. HARRIS
TYPEWRITER
Filed March 8, 1922   12 Sheets-Sheet 8
1,516,920
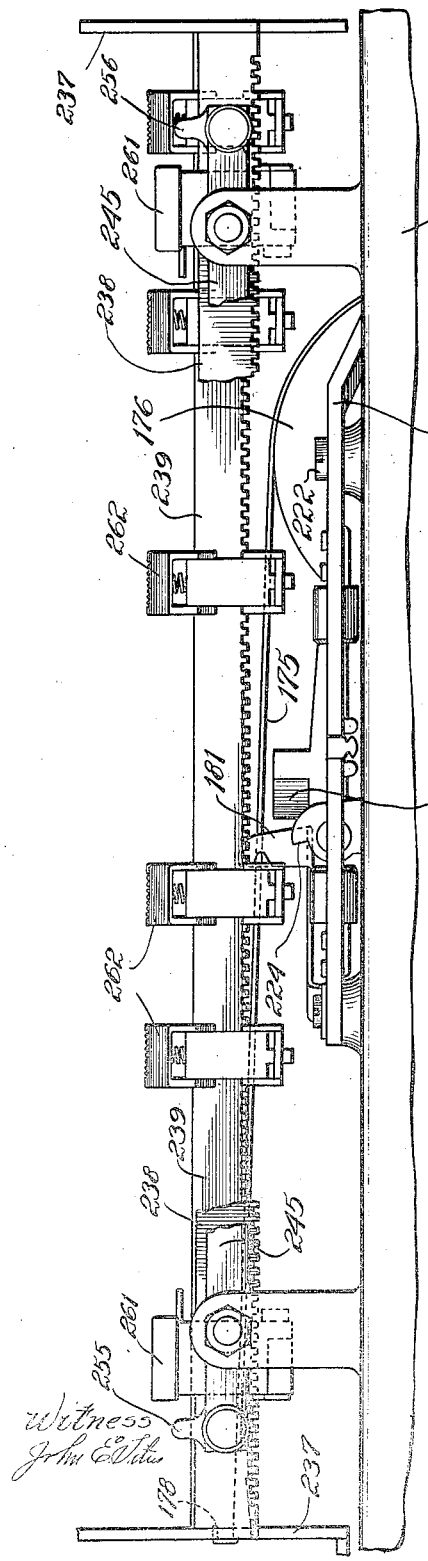
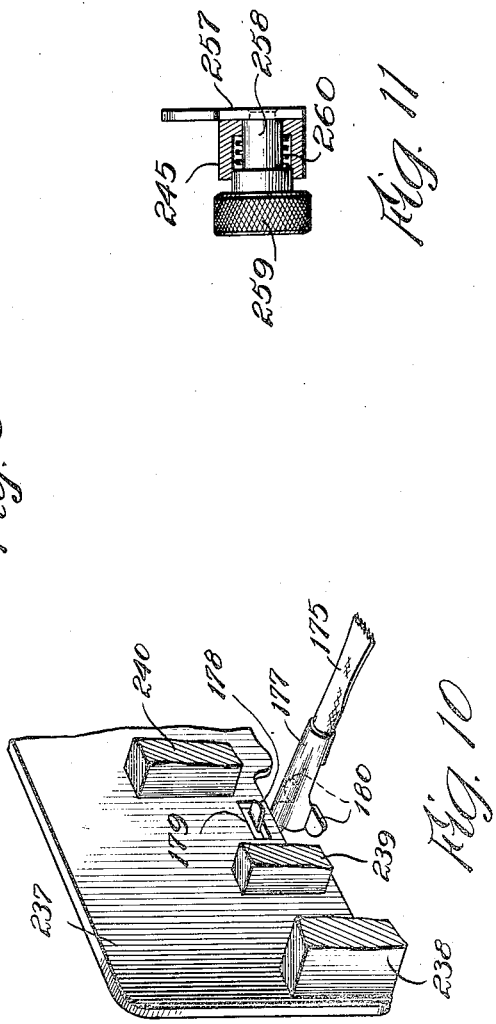

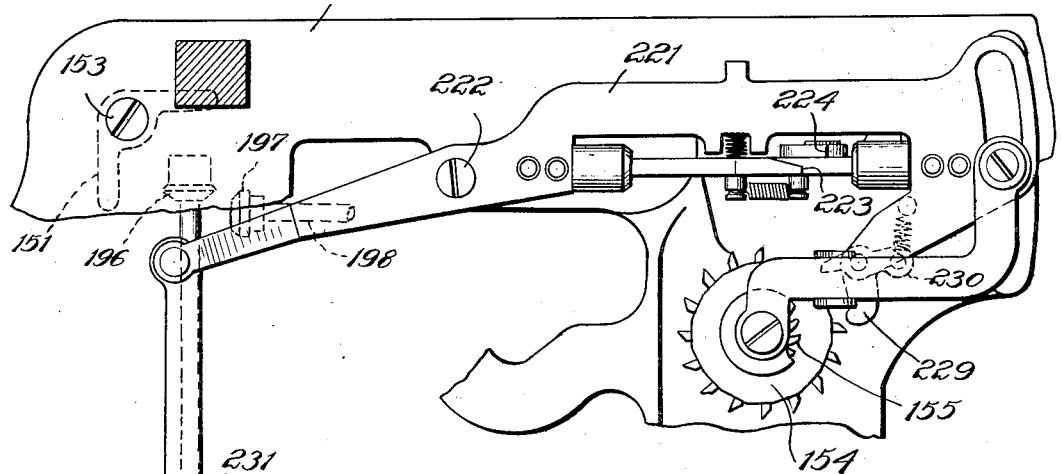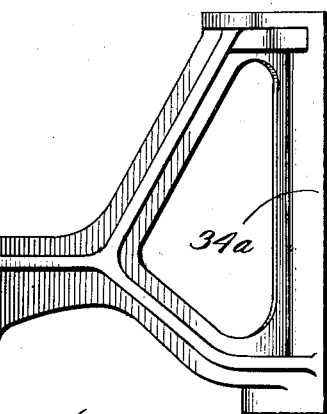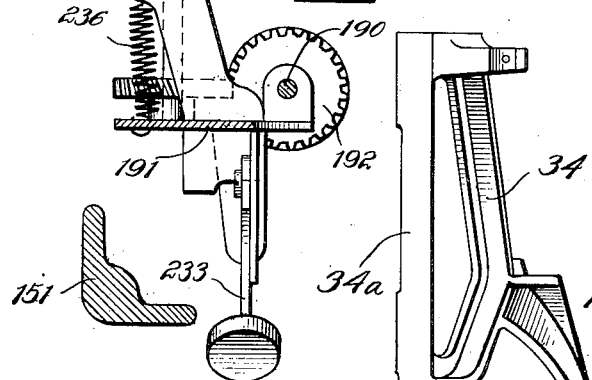

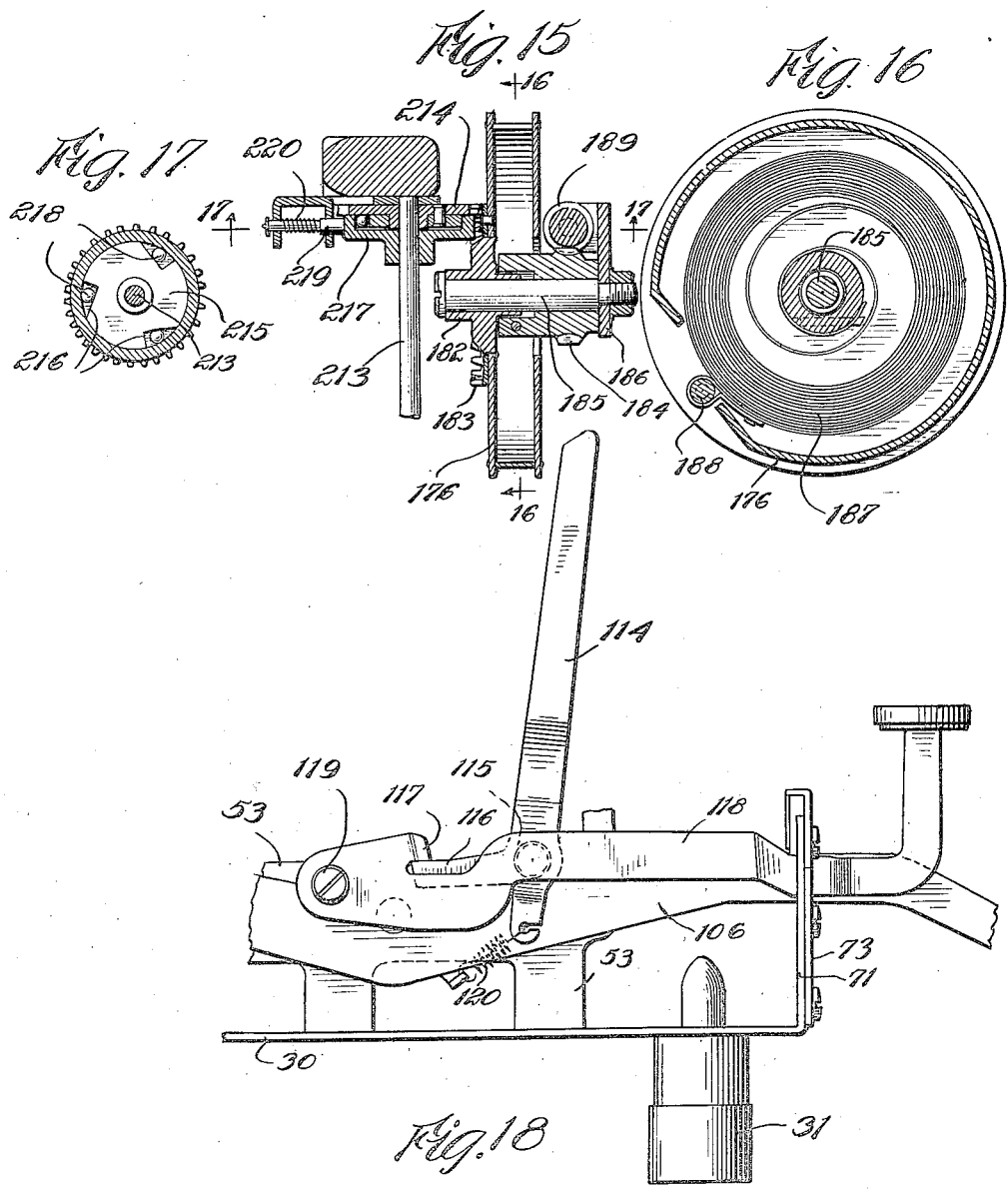

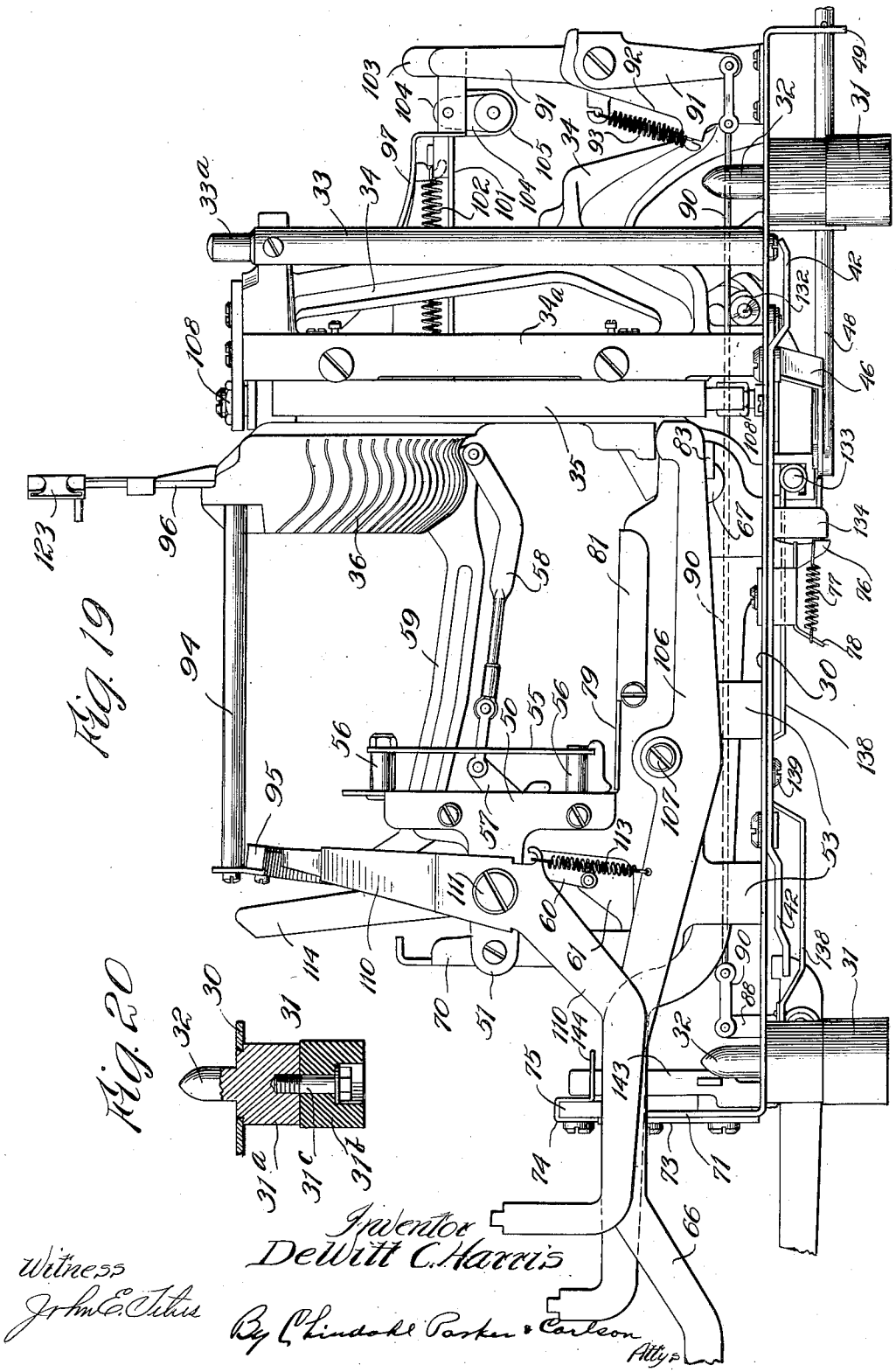

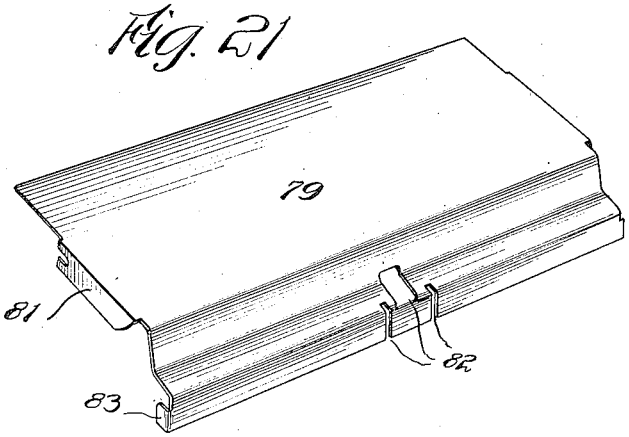
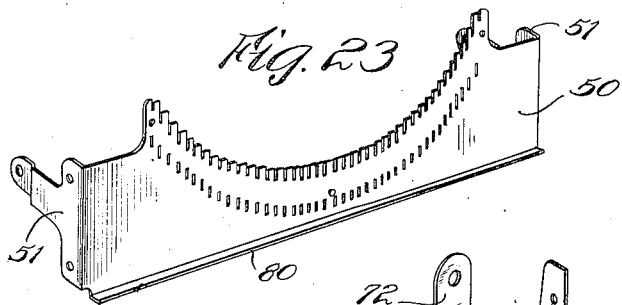
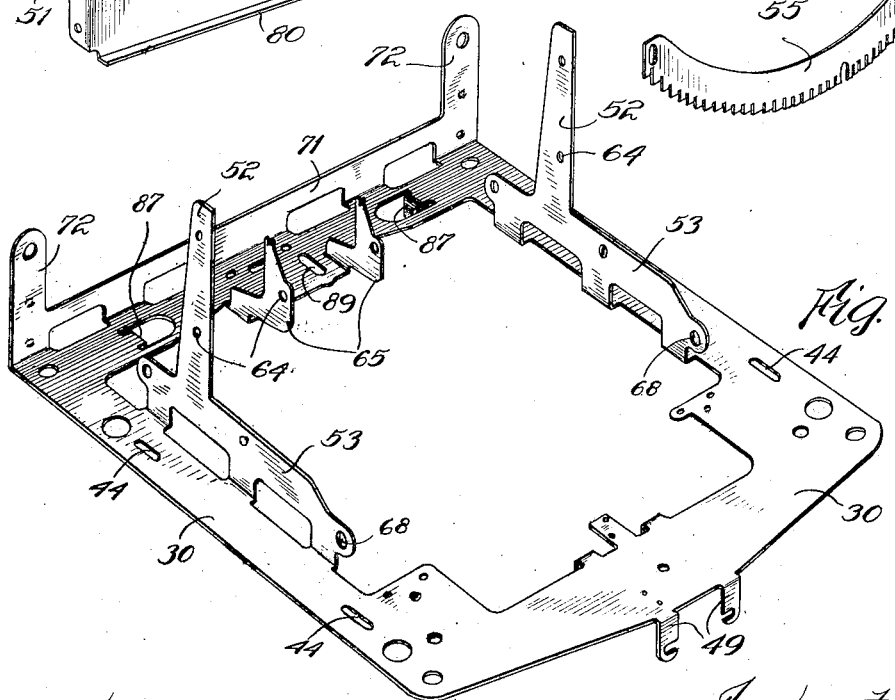

Patented Nov. 25, 1924.

1,516,920

UNITED STATES PATENT OFFICE.

DE WITT C. HARRIS, OF PINELAND, FLORIDA.

TYPEWRITER.

Application filed March 8, 1922. Serial No. 541,930.

*To all whom it may concern:*

Be it known that I, DE WITT C. HARRIS, a citizen of the United States, residing at Pineland, in the county of Lee and State of Florida, have invented a certain new and useful Typewriter, of which the following is a specification.

This invention relates to improvements in the framework of typewriters and to the manner of mounting the various operating devices and groups of mechanisms in the framework; and the general object of the invention is to produce an improved typewriter which is composed of separate units or main sections each complete in itself and capable of being separately assembled in the manufacturing operation, the said sections being constructed so that they may be readily separated and operatively reassociated so as to facilitate inspection, cleaning or repair, and to permit substitution of a new section for a worn one after the machine has been in use for a long time.

Stated more specifically, the invention aims to produce a readily demountable typewriter composed of three units, to wit, a main body or frame unit, a carriage unit, and a lower internal unit which will hereinafter be termed the action unit, which action unit is insertable bodily into the frame unit through the lower end of the latter and comprises the major portion of the operating mechanism of the machine.

A further object is to produce a novel typewriter of this character in which the units are secured against separation by simple finger-operated locks or fastenings so that all three units may be disassociated in an instant without the use of any tools.

Another object is to construct the action unit so that it will be flexible and may therefore accommodate itself to the frame unit in assembling the two units, whereby extreme nicety or accuracy in manufacture is rendered unnecessary, with the result that universality or interchangeability of all units in the process of assembling and manufacturing may be insured.

Another object is to correlate such parts of the mechanism as are mounted on the frame unit with parts on the action unit so that the respective parts of the two units will automatically be brought into operative relation by the simple act of assembling the two units together.

The invention also relates to the construction and relationship of individual parts and groups of mechanisms contributing to the foregoing objects.

Further objects and advantages of the invention will be understood from the following detailed description.

In the accompanying drawings which illustrate a preferred embodiment of the invention, Fig. 1 is a vertical central section from front to rear through a complete typewriter embodying my invention.

Fig. 7 is a horizontal sectional view showing in top plan the back spacer mechanism and a part of the ribbon driving and reversing mechanism.

Fig. 8 is a vertical sectional view taken in the plane of line 8—8 of Fig. 7 and showing a portion of the ribbon driving and reversing mechanism in elevation.

Fig. 9 is a rear elevation of a part of the frame unit and a part of the carriage unit, showing the tabulating mechanism.

Fig. 10 is a perspective view illustrating the means for detachably securing the draw band to the carriage.

Fig. 11 is a sectional detail view of a shiftable stop which permits ready removal of the carriage from the frame unit.

Fig. 12 is a top plan view of a portion of the tabulating mechanism.

Figs. 13 and 14 are rear and side elevations respectively of a frame bracket constituting part of the action unit.

Fig. 15 is a horizontal section through the power barrel and associated parts for moving the carriage and the ribbon.

Fig. 16 is a section taken in the plane of line 16—16 of Fig. 15.

Fig. 17 is a section through a friction clutch, taken in the plane of line 17—17 of Fig. 15.

Fig. 18 is a side elevational view of the tabulator levers on the action unit.

Fig. 19 is a side elevation of the complete action unit alone.

Fig. 20 is a sectional detail view of one of the supporting feet and dowel pins of the action unit.

Figure 1:
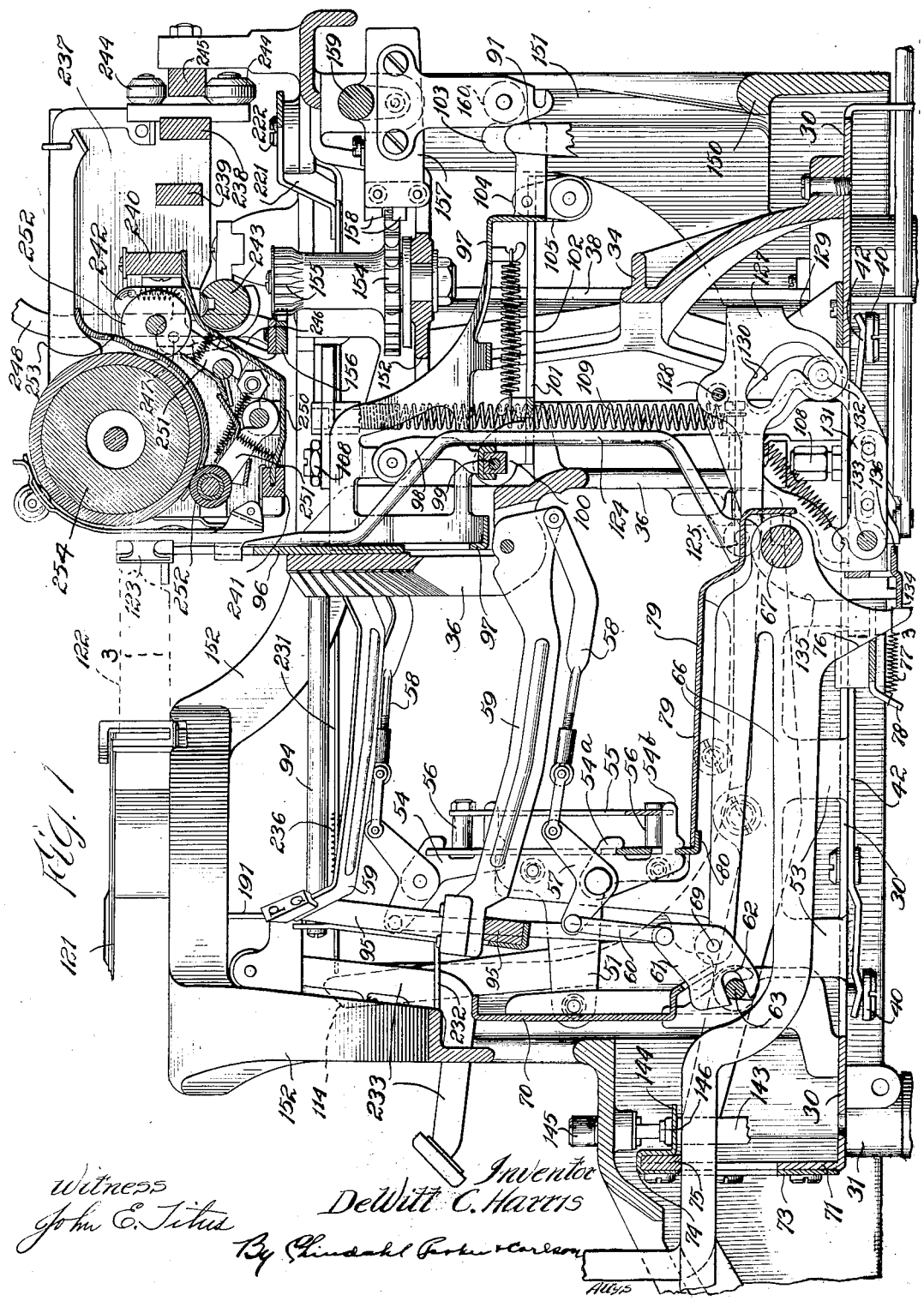

Figs. 21 to 25, inclusive, are detail perspective views of parts of the frame of the action unit, Fig. 25 showing the main base or frame piece of this unit on which all of the other parts are mounted.

For the sake of imparting knowledge of my invention I have illustrated in the drawings and will herein describe in detail one of the many possible embodiments of the inventive idea, but it should be understood that the description of this specific structure is not intended to be in any sense a limitation of the invention, the scope of which will be pointed out in the appended claims.

A brief description of the principal parts composing each of the three units will contribute to a better understanding of the more detailed description following hereafter.

The action unit, as shown in Fig. 19, comprises a frame, the key levers, the type bars, the connections between said levers and bars, the type bar segment and guiding means therefor, the pad for supporting the free ends of the type bars, the universal yoke which is actuated by the type bars for operating the escapement mechanism, the spacer bar and its connections for operating the escapement mechanism, the ribbon guiding and vibrating means and the ribbon color shift mechanism, the case shift levers, the back spacer lever, the tabulator levers, the guide posts, dowel pins, and latch means for securing the frame unit to the action unit, and other minor parts. The frame of the action unit is provided with the usual feet at its four corners to rest upon a desk or other support, and the frame unit and carriage unit are supported upon the frame of said action unit.

The frame unit as shown in Figs. 1 and 3 to 6, comprises the main frame casting consisting of a base casting and a deck or top plate, the bearings, dowel recesses, and studs to cooperate with the parts on the action unit for securing these two units together, a part of the back spacing means to cooperate with the back spacer lever on the action unit, the margin release and tabulating means to cooperate with the tabulator levers on the action unit, the carriage escapement mechanism to cooperate with the type-bar-actuated yoke and the spacer-bar-actuated lever on the action unit, the supporting and guiding rails for the carriage, the carriage moving means, the ribbon and its winding and reversing mechanism, the actuating buttons for the ribbon color shift mechanism, and other parts.

The carriage unit comprises the carriage frame, the platen, the paper guiding, holding and feeding mechanism, the carriage supporting and guiding bearings, the tabulator and marginal stops, the line space mechanism, the escapement rack which cooperates with the escapement pinion on the frame unit, and other minor parts.

The carriage unit may be removed from the frame unit simply by turning a stop device out of its operative position, disengaging the carriage feed rack, withdrawing the marginal stop dog, and then rolling the carriage endwise to the left off its guide bars, the draw band for the carriage automatically being caught and secured as the carriage is removed and being automatically re-engaged with the carriage when the latter is replaced.

The frame unit may be disconnected from the action unit by removing the ribbon from the guiding and vibrating device, and then drawing out a single finger piece which disconnects four latch means at the corners of the machine whereupon the frame unit may be lifted vertically out of association with the action unit without moving or disturbing the latter. The cooperating parts of te mechanism on the frame unit and the action unit respectively are so arranged that they move out of and into operative relationship in a vertical direction automatically in the act of removing or replacing the frame unit. These cooperating parts, just mentioned, on the frame and action units are as follows:

The escapement actuating lever on the frame unit is operated both by the universal type bar yoke and the spacer-bar-actuated lever on the action unit; the back spacing means on the frame unit is operated by the back spacer lever on the action unit; the tabulator mechanism on the frame unit is actuated by the tabulator lever on the action unit; and the ribbon color shift mechanism on the action unit is operated by a pair of buttons on the frame unit.

With the foregoing brief explanation of the general nature and relationship of the three units I will now proceed to describe in detail the respective units and the means of associating or connecting them.

I will first refer to the means for detachably associating and locking the frame and action units as follows: The action unit comprises a base plate 30 (Figs. 19 and 25) which is supported upon the usual posts or feet 31 at its corners. Dowel pins 32 project up from the said base plate above said feet and may be formed integral with said feet. As shown in Fig. 20, the upper metallic part 31ª of each foot has a reduced portion fitting in an opening in the base plate and secured therein by having its edge riveted over the edge of the opening. The lower rubber part 31ᵇ of the foot is secured by a screw 31ᶜ.

At opposite sides of the action unit near the rear end thereof are two upright cylindrical guide posts 33 having their lower ends fixed to the base plate 30 and their upper ends fixed to an irregularly shaped skeleton bracket 34 (see Figs. 13 and 14) which rises from and is fixedly secured to the base plate. The sides 34ª of this bracket carry the guides 35 for the shiftable type bar segment 36. The extreme upper ends of said guide posts 33 are reduced in diameter to form dowel pins 33ª.

Figure 5:
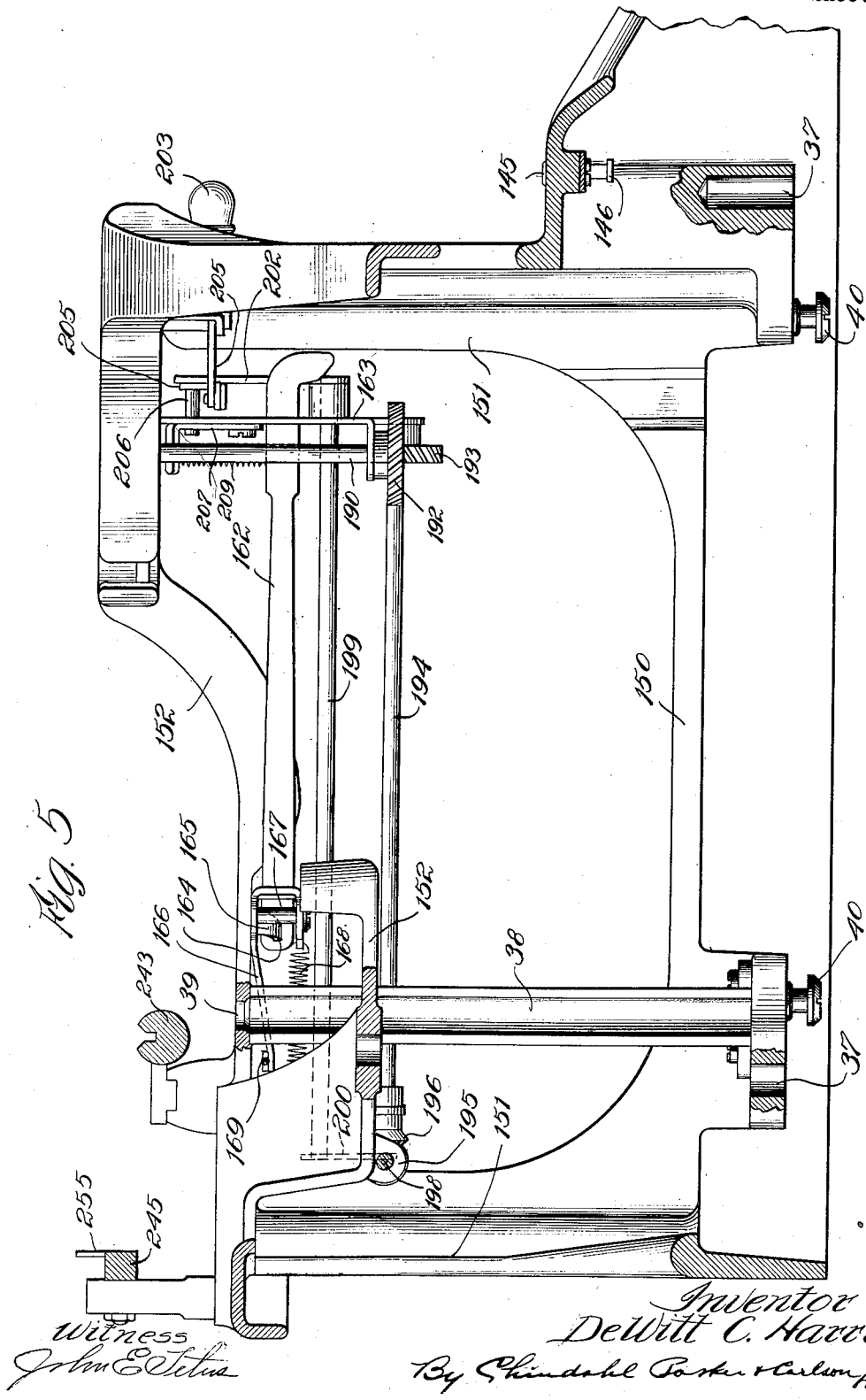
Figs. 5 and 6 are vertical sections through the frame unit alone, taken in a plane extending from front to rear and looking in opposite directions from said plane, certain parts of the operating mechanism, which are mounted on this unit, being omitted.
Figure 6:
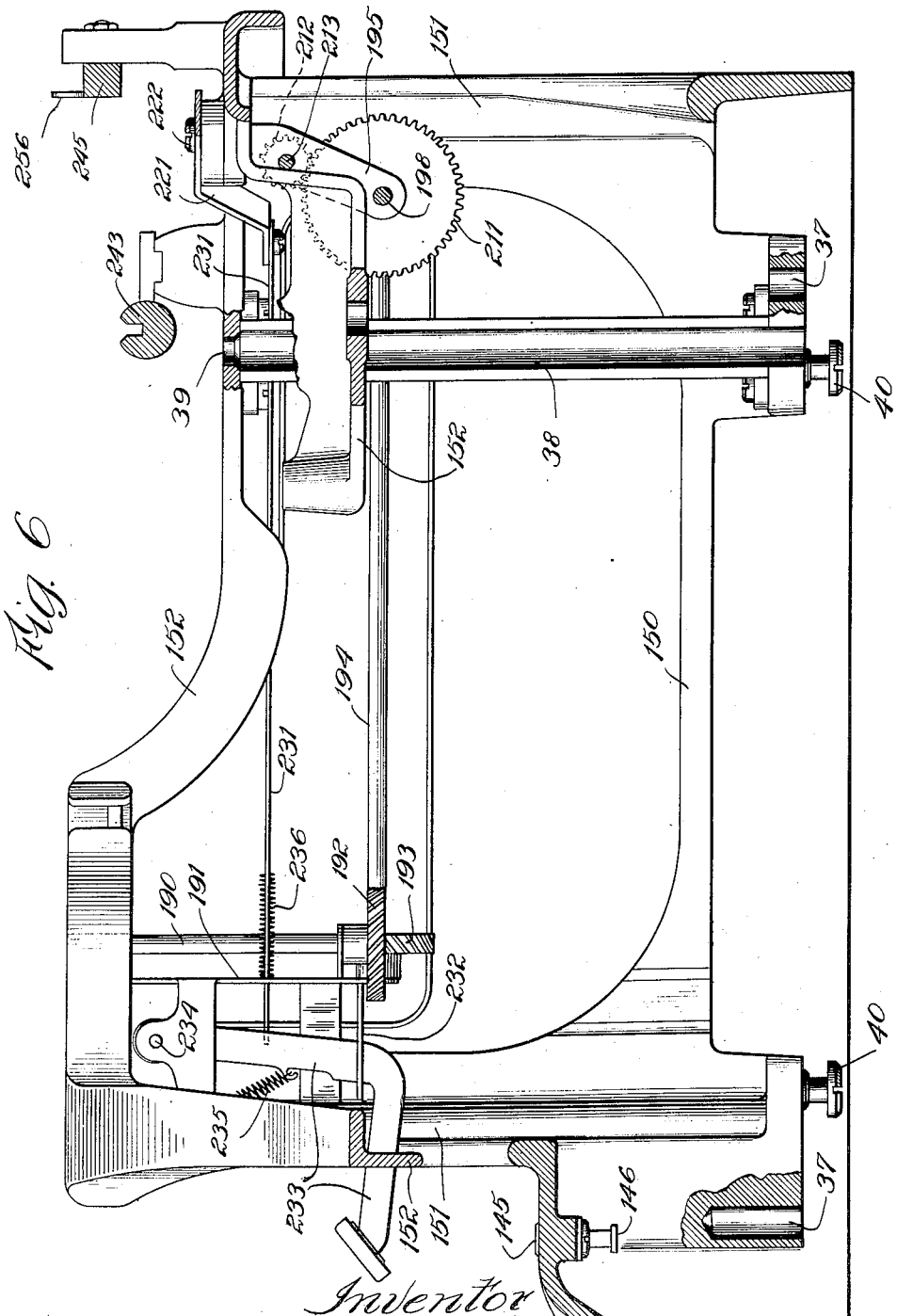

Referring now to Figs. 5 and 6, it will be seen that the frame unit has dowel recesses 37 at its four corners to receive the dowel pins 32 and the frame has semi-cylinder vertical bearings 38 to receive the guide posts 33 and also has dowel openings 39 in the deck or top plate of the frame to receive the dowel pins 33ª at the upper ends of the guide posts 33.

Figure 2:
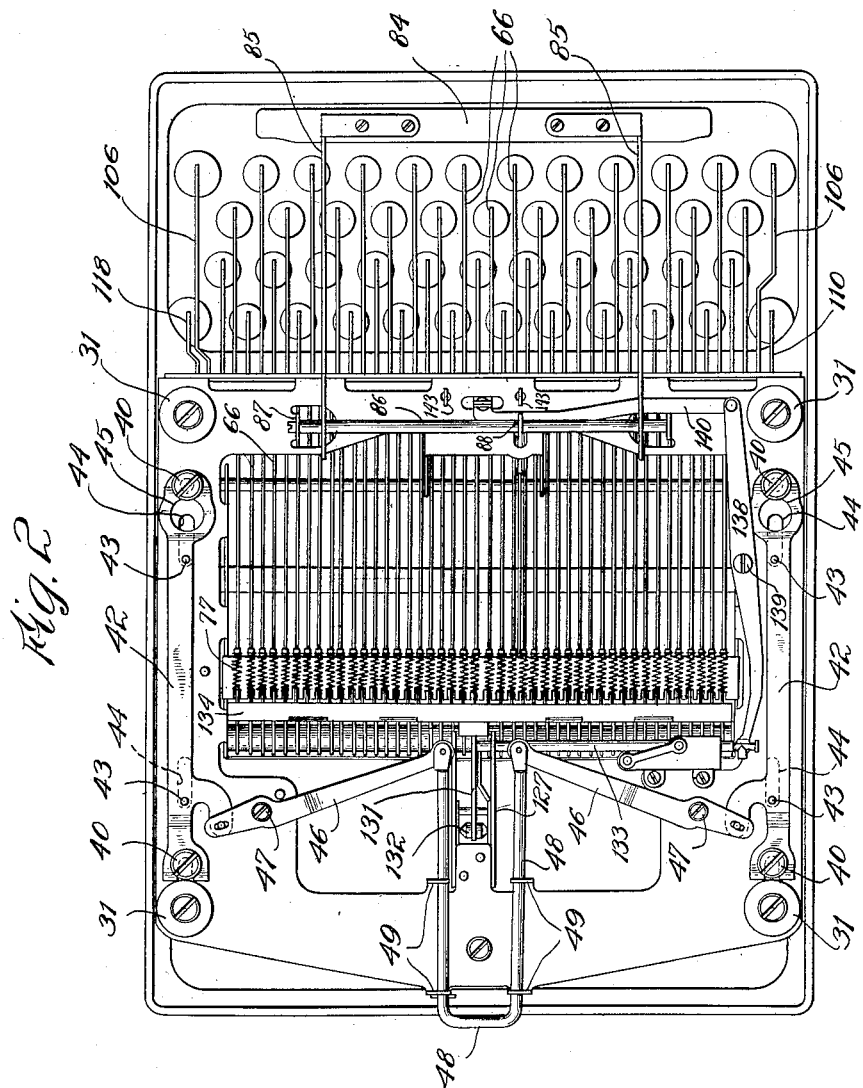
Fig. 2 is a bottom plan view thereof.

The frame unit also has four rigid depending headed fastenings 40 which are arranged to project through four holes 41 in the base plate 30 so that the heads of said fastenings are spaced a short distance beneath the base plate as best seen in Fig. 1. These heads are engaged by slidable locking devices in the form of two sheet metal bars 42 (Fig. 2) which are slidably secured beneath the base plate 30 by means of studs 43 fixed in the bars projecting up through slots 44 in the base plate and having heads overlying said slots.

The forward end of each of these bars has a key-whole shaped opening 45 therein, the larger portion of which is of sufficient size to permit the headed fastening 40 to pass therethrough and the smaller portion of which is of such size that when the bar is moved toward the rear end of the machine such smaller portion will embrace the shank of the fastening 40 and prevent upward withdrawal of the head.

The rear end of each of the bars 42 is bifurcated to embrace the shank of one of the fastenings 40 when the bar is in its rear position. Both the forward and rear ends of each bar are bent downwardly from the plane of the bar so as to directly engage the heads of the fastenings 40 and resiliently press against said heads, as will best be understood from Fig. 1. In this manner the frame unit is securely fastened to the action unit at or near the four corners of the machine.

The two bars 42 are arranged to be simultaneously slid by means of a pair of levers 46 (see Fig. 2) pivoted between their ends at 47 to the base plate of the action unit, one end of each lever having a pin and slot connection with one of the bars 42 and the other end of each lever being connected to one arm of a U-shaped finger piece 48 which underlies the base plate 30 and is slidably held by suitable lugs 49 on the base plate which hook over the arms of this finger piece. When the parts are in the position shown in Fig. 2, the two units will be secured together. When it is desired to separate the units the end of the U-shaped finger piece is grasped and pulled outward thereby swinging the levers 46 and moving the bars 42 forwardly to permit the withdrawl of the headed fastenings 40 from the action unit. In moving from one position to the other the arms of the finger piece 48 yield toward each other to permit the levers 46 to swing through the necessary arc, and the resiliency of the arms of said finger piece tends to hold the levers in either one of their two positions.

The base plate 30 of the action unit is made of sheet metal and since this base plate forms the foundation or support for all parts of the unit, the unit as a whole is resilient or flexible. Therefore the guide posts 33 and dowel pins 32 may yield laterally to accommodate themselves to the positions of their sockets or bearings in the frame unit so that extreme nicety or exactness of relationship of the interengaging parts of the two units is rendered wholly unnecessary, with a resulting economy in manufacturing and assembling the machine. This flexible characteristic of the action unit also contributes to other advantages including the relationship of the type bar guide and ribbon vibrator to parts on the carriage as will be explained later.

Figure 3:
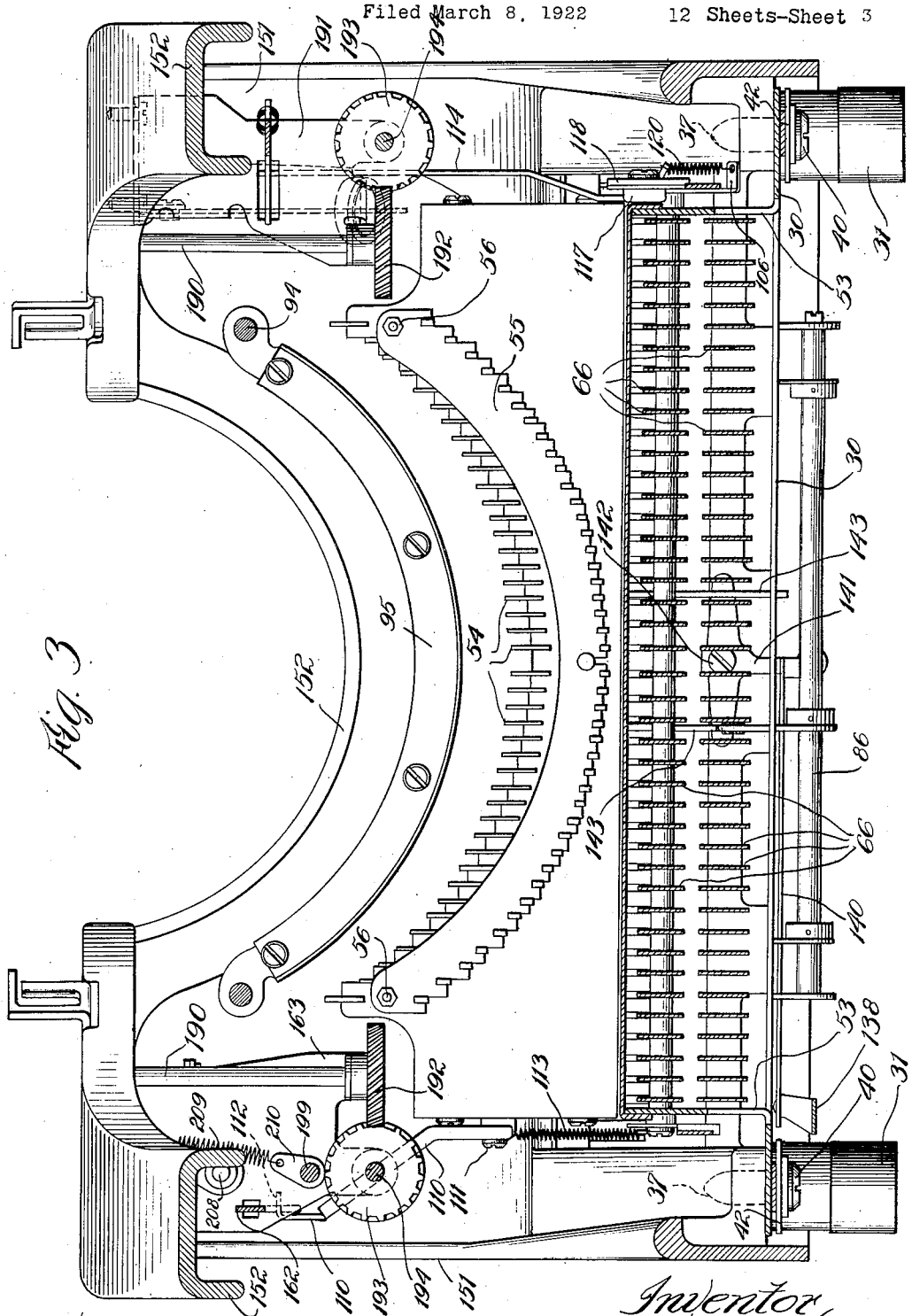
Fig. 3 is a vertical transverse section taken in the plane of line 3—3 of Fig. 1 and looking toward the front of the machine.

The framework of the action unit comprises in addition to the base plate 30, a bracket 50 (Fig. 23) which may also be formed of a sheet metal stamping and has end flanges 51 arranged to overlap and be secured to upright fingers 52 forming continuations of vertical flanges 53 on the base plate. This bracket 50 provides the main support for the series of bell-cranks which form part of the connection between the key-levers and type-bars to be presently explained, said bell-crank being mounted upon hangers 54 (Fig. 22), which hangers are anchored and secured by an arcuate locking piece 55 (Fig. 24) which is secured to the bracket 50 in spaced relation by means of suitable fastenings 56 (Figs. 1, 3 and 19).

Each of the hangers 54 has an arm 54ª (Fig. 1) which engages in one of a series of notches in the arcuate upper edge of the bracket 50, and the hanger has another arm 54ᵇ which extends through one of a series of apertures in the bracket and is provided with a notch in its lower edge to engage the bottom of said aperture, the free end of the arm being received in a notch in the lower edge of the locking piece 55, which piece secures the series of hangers firmly to the bracket 50. There are as many of these hangers as there are type bars and key levers. To each hanger is pivoted one of a series of bell-crank levers 57 which has one arm connected by a link 58 to the heel of one of the type bars 59. The other arm of the bell-crank is connected by a link 60 to one of a series of rockers 61 which has a notch 62 receiving a horizontal shaft 63. This shaft is mounted in openings 64 (Fig. 25) in the fingers 52 and in upright ears 65 on the base plate 30.

The key levers 66 are pivoted at their rear ends upon a shaft 67 which is mounted in openings 68 (Fig. 25) in the base plate, there being four banks of key levers of successively greater lengths. Each key lever is of cleft or bifurcated formation providing two arms, the shorter of which overlies the longer arm that carries the key. The short arm is pivoted at 69 to the rocker 61 so that upon depression of the key lever, the rocker 61 will be drawn downwardly and will also be moved forwardly at its slotted connection with its pivot shaft 63. This movement, through the link 60, bell crank 57 and link 58, will raise the type bar to strike the platen. This key-lever and type-bar action is disclosed and claimed per se in my copending application Serial No. 545,646 filed March 22, 1922.

A plate 70 has end flanges which are attached to the arms 51 projecting forwardly from the bracket 50 (see Fig. 1). The lower edge of this plate 70 is supported in notches in the upper ends of the ears 65 on the base plate and the said lower edge of the plate is slotted to provide a comb in the recesses of which the rockers 61 are located and are thereby spaced and guided.

The front end of the base plate 30 has an upturned flange 71 with two lugs 72 at its ends and to this flange and lugs is secured a comb 73 by the spaces of which the key levers are spaced and guided. A channel piece 74 is also secured to the upper ends of the lugs 72 and contains a strip 75 of leather or other suitable material which provides a stop against which the key levers abut on their upward movement.

Each of the key levers has a downwardly extending lug 76 on its rear end and to these lugs a series of springs 77 are fastened, said springs being connected at their other ends to teeth on a plate 78, the ends of which are bent up to overlie and are secured to the sides of the base plate 30. These springs 77 return the key levers to normal position in contact with the stop 75 after depression thereof.

A dust pan 79 (Fig. 21) overlies the rear portions of the key levers, the forward end of said pan resting on a flange 80 at the lower edge of the bracket 50. The pan has depending flanges 81 at its ends which are secured to the upstanding flanges 53 on the base plate. The rear edge of the dust pan is bent downwardly behind the key levers and is apertured as at 82 to permit the necessary movement of certain parts of the ribbon vibrating mechanism. The rear corners of the pan have lugs 83 which are bent to overlie the ends of the fulcrum shaft 67 for the key levers to hold said shaft in its bearings, as shown in Fig. 19.

The spacer bar 84 which is located in front of the bank of keys (Fig. 2) is supported on two arms 85 which are fixed upon a rock shaft 86 that is mounted in depending ears 87 on the base plate 30. On the mid-portion of this rock shaft is fixed an upright arm 88 (Fig. 19) which projects through a slot 89 in the base plate 30 and is attached to the forward end of a link 90 which link runs to the rear end of the machine and is there pivoted to an upright lever 91 which is pivoted between its ends to a bracket 92 fixed on the base plate 30. The upper end of this lever is positioned to engage the rocker device of the escapement mechanism on the frame unit and actuates said device when the spacer bar 84 is depressed. A tension spring 93 strained between a lug on said lever and a lug on the supporting bracket 92 tends to draw the upper end of the lever forwardly and maintain the spacer bar 84 in raised position.

The type bar segment 36 and guides therefor are mounted in the irregularly shaped bracket or casting 34 which is secured to and rises from the rear portion of the base plate 30. To the sides 34ᵃ of this frame are secured the channel guides 35 which complement the channel guides on the type bar segment, said complementary guides receiving between them antifriction balls and spacers to permit up and down movement of the segment, in a manner well known in the art. The segment has two rods 94 projecting forwardly from its opposite sides and carrying an arcuate support and pad 95 on which the forward ends of the type bars 59 rest. A type guide 96 is fixed to and projects up from the segment.

Behind the type bars is a universal escapement-actuating yoke 97, the forward edge of which is curved to conform to the segment so that it will be struck by the base of any one of the type bars when rising to strike the platen. This yoke is carried at its forward end by a pair of upright arms 98 pivoted to the yoke and fixed upon a rock shaft 99 which is supported in upstanding ears 100 on a plate 101 that is rigidly carried by the segment. A spring 102 is strained between parts on said yoke and plate respectively and tends to hold the yoke in its forward position. The rear end of the yoke has an upright finger 103 positioned to actuate the rocker of the escapement mechanism on the carriage unit as is apparent in Fig. 1, and said rear end of the yoke is supported by an arm 104 which is pivoted to a depending ear 105 on the plate 101.

The type-bar segment 36 is arranged to be elevated to print capital letters by means of either one or two case shift levers 106 located at opposite sides of the machine and pivoted at 107 to the flanges 53 on the base plate, the rear ends of said levers underlying parts on the type bar segment. The forward ends of said levers are guided in the comb 73. Suitable fixed stop devices 108 are positioned above and below opposite sides of the type bar segment to limit movement thereof and determine its position for accurate printing.

Coiled tension springs 109 strained between parts on the frame bracket 34 and parts on opposite sides of the segment act to partially counterbalance the weight of the segment whereby to decrease the force necessary to elevate the segment.

A back-spacer lever 110 of bell-crank form is pivoted at 111 to one of the arms 51 of the brackets 50 and is guided by the comb 73. On the upper end of this lever is an angular lug 112 (Fig. 3) arranged to cooperate with back-spacing means on the frame unit which will be later described. A spring 113 strained between the back-spacer lever 110 and one of the case-shift levers 106 tends to hold the forward ends of both levers in their elevated position.

A tabulator arm 114 is pivoted at its lower end at 115 (Fig. 18) to one of the flanges 53 of the base plate 30, and has a finger 116 arranged to be engaged by an overlying lug 117 on a tabulator key lever 118. This lever is pivoted at 119 to one of the flanges 53 on the base plate and is guided at its forward end by one of the slots in the comb 73. A spring 120 strained between the extreme lower end of the lever 114 and a lug on the left hand case shift lever 106 maintains the levers 106, 114 and 118 in their normal position. When the tabulator lever is depressed it swings the arm 114 rearwardly to operate the tabulating mechanism on the frame unit which will later be described.

The ribbon 121 is wound upon rotary spools 122 (Figs. 1 and 3) which are located on top of the deck section of the frame unit. That portion of the ribbon which is in proximity to the platen is carried in two guides 123 arranged at opposite sides of the printing point, said guides being secured to a vibrator stem 124 which is mounted on the type guide 96 for vertical reciprocation. The lower end of the stem 124 is pivotally connected at 125 (Fig. 1) to the forward end of an arm 126 which is integral with or otherwise attached to a cam structure 127. The latter is pivoted at 128 to a bracket 129 fixed to the base plate 30. The cam structure 127 contains two cam slots 130 of different forms, one being adapted to provide sufficient movement to raise the ribbon guides 123 from their normal position to a position where the upper field of the ribbon may be struck by the type, and the other cam being of such form as to provide sufficiently greater movement to bring the lower field of the ribbon into printing position. In the present embodiment, the cam structure 127 consists of a piece of sheet metal folded to form two spaced parallel sides and a rear connecting web.

A pivoted arm 131 is provided with two roller studs 132 on its free end (see Figs. 1 and 2) to engage in the cam slots 130, said arm being fixed upon a rock shaft 133 that is shiftable longitudinally to cause said studs to engage in either cam slot or to lie in an ineffective position between the sides of the cam structure. The arm 131 is actuated by a universal bar 134 having arms 135 at its ends which are pivoted upon the pivot shaft 67 for the key levers 66. The universal bar 134 normally is in contact with the downwardly extending arms 76 on the key levers. At the middle of the universal bar 134 is a rearwardly-extending projection 136 arranged to engage a depending lug fixed to the rock shaft 133. The shaft 133 extends transversely of the machine from the right hand side thereof, to a point about midway of the sides of the machine. Said cam slots are of such form that when the ribbon vibrator is in its position of rest, the lower ends of the cam slots are in position for engagement by either of the rollers 132. The outer sides of said rollers and the ends of the pin on which they are mounted are tapered or coned to guide the rollers into engagement with the cam slots. The space between the slotted sides of the cam structure 127 is sufficient to permit the rollers 132 and their pivot pin to lie between said sides and out of engagement with both cam slots. A coiled contractile spring 137 connected at one end to the pivot 128 and at its other end to a lug rigid with the shaft 133, normally holds the arm 131 in its lowermost position.

The means for longitudinally shifting the shaft 133 to place the rollers 132 in engagement with the desired cam slot or in central neutral position may partake of various forms. That herein shown comprises a lever 138 (Fig. 2) pivoted between its ends at 139 to the base plate 30. The rearwardly extending arm of the lever 138 has a bent end which embraces a reduced portion of the shaft 133 so that it may shift the shaft longitudinally in either direction. To the forwardly-extending arm of the lever 138 is pivoted a link 140 which extends to the longitudinal median plane of the machine and is there pivoted to the downwardly-extending arm of a three-arm lever 141 (Fig. 3). Said three-arm lever is mounted to swing upon a horizontal axis 142 and comprises two oppositely-extending horizontal arms which extend freely through openings in the lower portions of two vertical parallel slides 143. These slides are guided for vertical movement in apertures in the base plate 30 and in a flange 144 (Fig. 1) on the pad holder 74. Two plungers 145 are mounted on the frame unit just behind the keyboard and have at their lower ends heads 146 which engage the upper ends of the slides 143. The upper ends of the plungers 145 constitute finger keys adapted for depression by the operator.

It will be seen that when one of the plungers 145 is depressed, the three-arm lever 141 will be swung in the direction to push the shaft 133 endwise into position to place the arm 131 in engagement with one of the cam slots 130, so that oscillation of the arm 131 will cause movement of the ribbon guides 123 to place either the upper field (for example, the black field) or the lower field (the red field) in printing position depending upon which plunger 145 is depressed. If the operator depresses both of the plungers 145 to an equal extent, the arm 131 will be caused to occupy a central position midway between the slotted sides of the cam structure 127, thus disconnecting the said cam structure from the arm 131 and permitting operation of the machine with the ribbon at rest in its lower or ineffective position, as is desirable when cutting stencils.

This ribbon vibrating and color-shift mechanism is described and claimed in my copending application Serial No. 558,077, filed May 3, 1922.

The frame unit.

Referring now to that section of the machine which I have, for convenience, termed the frame unit, the framework proper of this unit may consist of two castings, i. e., the lower rectangular frame 150 with the corner posts 151 rising therefrom being one casting, and the top plate or deck 152 being a separate piece suitably secured as by screws 153 (Fig. 4) to the said corner posts.

This frame unit carries the following mechanisms which will be described in the order mentioned: The carriage escapement mechanism; the back spacing mechanism; the carriage moving mechanism; the ribbon driving and reversing mechanism; and the tabulating and marginal release mechanism. Each of these mechanisms, broadly speaking, may be of any common or well-known construction, but each has certain points of novelty in respect to its relation of parts and means of mounting the same in the frame unit, in such a way that this frame unit is an independent structure capable of being readily associated with and disassociated from the other two units of the machine in conformity with the broad and general objects of the invention as heretofore set forth. Each of the five mechanisms just mentioned will therefore be described only to an extent necessary to enable a person skilled in the typewriter art to understand the construction and manner of mounting the mechanism in the frame unit and without any intention of limiting the present invention in its major aspects to the specific details of construction represented in the present exemplary embodiment of the invention as shown in the drawings. The novel features will be pointed out in the claims.

The escapement mechanism.

On the rear central portion of the deck is mounted the escapement wheel 154 and pinion 155 rigid therewith which pinion meshes with the usual rack bar 156 that forms a part of the carriage and is movably mounted so that it may be moved into and out of engagement with the pinion 155. The rocker device 157 with the usual escapement dogs 158 is pivoted to swing on the axis 159 and has a roller 160 on its lower end of sufficient length to be engaged both by the upright finger 103 on the escapement yoke 97 and by the spacer-bar, actuated lever 91 hereinbefore described. A spring 161 (Fig. 4) engaging the depending arm of the rocker is anchored at its other end to a fixed part of the frame and draws forward constantly on the rocker. This escapement mechanism may be of the usual construction and need not be further described in detail but it should be noted that there is a novel relation of the rocker 157 to the yoke 97 and lever 91, such that when the frame unit is withdrawn upwardly from the action unit, the rocker is free to rise out of engagement with the said yoke and lever, and on the other hand the rocker automatically assumes its operative engagement with said yoke and lever when the frame unit is passed downwardly over the action unit in assembling these two units, the yoke finger 103 and the lever having rounded upper ends to insure easy assembly.

The back-spacing mechanism.

Referring to Figs. 3, 5 and 7, that portion of the back-spacing mechanism which is mounted on the frame unit comprises a bar 162 which is slidably supported at its forward end in a slot formed in a depending bracket 163 fixed in the frame, the rear end of said bar having an aperture 164 (Fig. 5) to receive a lug 165 on a lever arm 166 which is folded to form upper and lower wings that are mounted to swing about a vertical pivot pin 167. To the lower wing of this lever arm 166 is attached one end of a coiled tension spring 168 the other end of which spring is anchored to a fixed bracket in the framework so that the spring tends to maintain the bar 162 and the lever 166 in the position seen in Fig. 7. The rear end of this arm is connected by a link 169 (Fig. 7) to an arm 170 which carries a pivoted dog 171 arranged to engage the escapement wheel 154 and move the latter in a reverse direction one space at each reciprocation of the sliding bar 162. A leaf spring 172 carried by the end of the arm urges the dog 171 toward the wheel 154 but a fixed stop 173 which engages a heel 174 on the dog normally holds the dog away from the heel. By reference to Figs. 3, 5 and 7 it will be seen that the angular forward end of the bar 162 is so related to the lug 112 on the upper end of the back spacer lever 110 hereinbefore described, that said bar 162 will automatically be moved out of and into operative engagement to said lever in the removal and replacement of the frame unit, the depending angular end of the bar lying in front of the lug 112 when the machine units are assembled.

*The carriage moving mechanism.*

Figure 4:
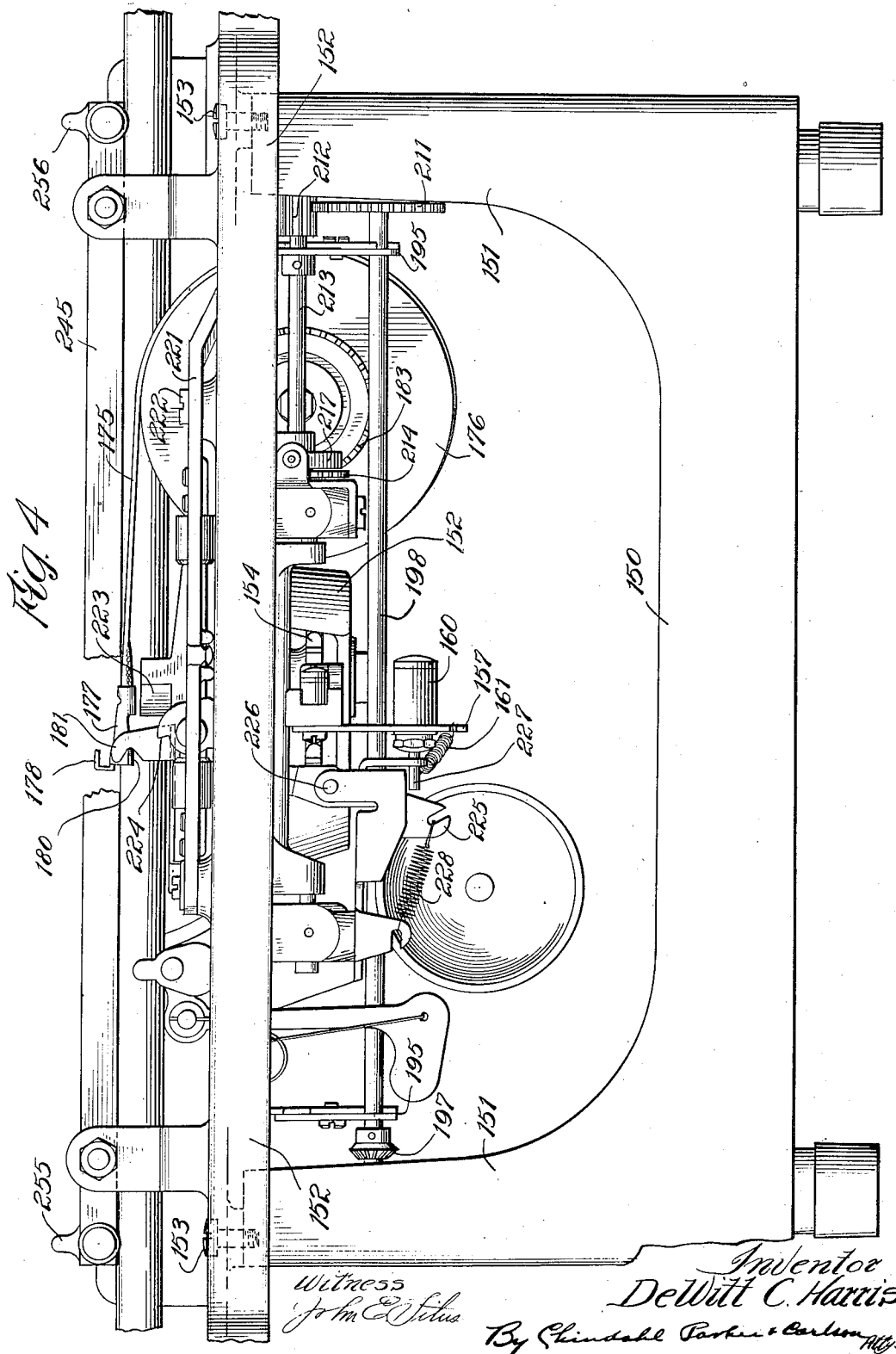
Fig. 4 is a rear elevation of the frame unit.

The carriage is arranged to be drawn to the left under the control of the escapement mechanism by a flexible drawband 175 (Figs. 4, 9 and 10) which is wound upon and has one end secured to a power barrel 176, the other end of said band having fixed thereon a clip 177. This clip is peculiarly formed to detachably engage the carriage and a fixed stop on the frame unit so that the clip automatically engages with the proper part in the act of removing and replacing the carriage. As best seen in Figs. 4 and 10, the clip has an upper hook 178 arranged to engage in an aperture 179 in one of the end plates of the carriage frame. The clip also has a pair of horizontal oppositely projecting lugs 180 which are arranged to engage in notches in an upstanding bracket 181 fixed upon the frame unit, said bracket comprising two spaced vertical sides between which the clip 177 is arranged to pass so that the lugs 180 of the clip will engage the two sides of the bracket. It will be understood that this bracket is so positioned on the frame unit that the clip 177 never engages the bracket in the normal operation of the typewriter and comes into such engagement only in the act of withdrawing the carriage from its ways on the frame unit. When the clip engages the bracket, the clip and drawband are held securely so that the hook 178 is automatically disengaged from the aperture 179 in the carriage as the carriage is withdrawn.

The power barrel 176 comprises two sides (see Figs. 15 and 16) and a connecting arcuate wall which has lugs on its edges protruding through and riveted over apertures in said sides. In a central opening in one of said sides is fixed a hub 182 and surrounding said hub is a gear 183 which is also fixed to said side. The opposite side has a central opening through which projects the hub of a worm wheel 184, said worm wheel hub and hub 182 being rotatable upon a shaft 185 which is fixed to a supporting bracket 186 on the frame unit. A convolute spring 187 surrounds the said hubs within the barrel 176 and has its outer end attached to a pin 188 that is fixed to the barrel, the inner end of said spring being attached to the hub of the worm wheel 184. A worm 189 meshes with the worm wheel 184 and is arranged to be rotated manually by suitable means for the purpose of turning the hub of the worm wheel 184 to tension the spring 187. This worm gearing tensioning means requires no lock to hold the spring at the desired tension.

*The ribbon driving and reversing mechanism.*

The ribbon spools 122 are fixed upon the upper ends of two vertical shafts 190 (see Figs. 3 to 8 and 15) which are rotatably mounted respectively in bracket 163 heretofore mentioned and a similar bracket 191 at the opposite front corner of the frame. On the lower ends of these shafts are fixed spiral gears 192 which mesh with similar gears 193 fixed on the forward ends of two horizontal shafts 194 which extend along the sides of the machine and have their forward ends mounted in the brackets 163 and 191 respectively. The rear ends of said shafts are mounted in brackets 195 at the rear corners of the frame and said shafts carry on their rear ends bevel pinions 196 which are arranged to mesh with similar bevel pinions 197 on horizontal shaft 198 that extends across the rear end of the machine and is longitudinally slidable and rotatable in the brackets 195. Only one of the pinions 197 is in mesh with one of the pinions 196 at a time, the shaft 198 being longitudinally shiftable to engage and disengage said pinions so as to drive the shafts 194 and therefore the spools 122 alternately to wind and unwind the ribbon in a manner well-known.

The means for longitudinally shifting the shaft 198 comprises a horizontal rock shaft 199 extending along the right hand side of the machine from front to rear above one of the shafts 194. On the rear end of this shaft is fixed a depending arm 200 (Fig. 5) which is arranged to engage between two shoulders 201 (Fig. 7) on the shaft 198 so that when the shaft 199 is rocked, the shaft 198 will be shifted. The forward end of the shaft 199 is mounted in the bracket 163 and has an upstanding arm 202 fixed thereon on the forward side of said bracket.

A finger lever 203 is pivoted between its ends at 204 to a suitable fixed bracket, the forward end of said lever projecting from the front portion of the frame upon the key board so as to be operable by the operator. The rear end of said lever is connected by a link 205 to the upper end of the arm 202. A pin 206 fixed in the upper end of the arm 202 projects through an aperture in the bracket 163 and engages in a slot in an arm 207 that is pivoted at 208 at the rear side of the bracket. A coiled tension spring 209 is attached on one end of the upper end of the arm 207 and its lower end to a suitable anchor 210 pivoted on the shaft 199. When the finger lever 203 is swung the pin 206 will swing the arm 207 to opposite sides in a vertical plane passing through its pivot 208 and the spring 209 will hold the arm in either position at opposite sides of its center and thereby will hold the arm 202 and the shaft 199 in either one of two positions. Thus by operating the lever 203 the operator may shift the shaft 198 to move either one of the pinions 197 into engagement with its associated pinion 196 so as to wind the ribbon in the desired direction.

The means for driving the shaft 198 comprises a spur gear 211 (Fig. 11) which meshes with a spur pinion 212 fixed on one end of the shaft 213. The pinion 212 is wide enough to remain in engagement with the gear 211 in the longitudinal shifting of the shaft 198. The opposite end of said shaft has a clutch connection with the gear 183 upon the power barrel previously described. Referring to Figs. 15 and 17, this clutch connection comprises a pinion 214 loose upon the shaft 213 and meshing with the gear 183. A clutch element 215 is rigid with the pinion 214 and has peripheral notches 216. A housing 217 is rigidly fixed on the shaft 213 and encloses the clutch element 215. Balls 218 are located in the notches 216 and are arranged to lock themselves in the notches and against the flange of the housing 217 when the power barrel and gear 183 are moving in the direction to draw the carriage toward the left during the writing operation. When the carriage is moved in the opposite direction the balls 218 release the housing 217 so that the shaft 213 remains stationary. A brake shoe in the form of a plunger 219 is pressed by a spring 220 against the outer periphery of the housing 217 so as to prevent reverse movement of the housing when the balls 218 are locking themselves as described.

*The tabulator and margin release mechanism.*

The tabulator and marginal release mechanism (see Figs. 3, 4, 6, 9 and 12) which is herein shown comprises the usual lever 221 pivoted between its ends at 222 to the rear end of the deck portion of the framework, one end of said lever carrying the usual pivoted stops 223 and 224 to cooperate with the adjustable tabulator and marginal stops respectively on the carriage. The tabulator stop is pivoted on the lever on an axis running transversely of the machine and is spring-held to yield rearwardly. The marginal stop 224 is pivoted on the tabulator stop 223 on an axis running from front to rear of the machine and is spring-held to yield to the right as viewed in Figs. 4 and 9. The stop 224 has a depending tail which is normally in position to engage the upper end of a line lock lever 225 pivoted between its ends at 226 the lower end of which lever is in position to be moved behind a pin 227 on the escapement rocker 157 to prevent movement of said rocker and thereby through the yoke 97 prevent the type bars from striking the platen. A spring 228 normally holds the lever 225 away from the pin 227.

The tabulator lever 221 has a finger 229 extending forwardly and arranged to engage the rack bar 156 on the carriage and move it out of mesh with the escapement pinion. Said finger carries a pivoted spring pressed dog 230 arranged to engage with the escapement pinion 155 to insure proper position of the carriage when the rack bar 156 is reengaged with the pinion.

The opposite end of the lever 221 is pivoted to a link 231 the forward end of which is slidably supported in a slot formed in the depending bracket 191 previously mentioned. This bracket has a forwardly bent flange 232 (Fig. 6) which is slotted to receive and guide a margin release lever 233 pivoted at its upper end at 234 to a flange on said bracket and carrying at its lower or outer end a key to be moved by the operator. A coiled spring 235 tends to hold the lever in its forward position and a coiled spring 236 tends to hold the link 231 in its forward position in abutting relation to said lever. When the operator pushes against the key on the lever 233 the lever 221 will be swung to move the stop 224 thereon out of the path of the marginal stop on the carriage.

The upper end of the tabulator arm 114 heretofore described lies alongside of the vertical portion of the marginal release lever 233 and in abutting relation to the end of the link 231 so that when the tabulator key lever 118 is depressed by the operator, the tabulator arm 114 will move the link 231 rearwardly to swing the lever 221 and operate the stop 223 to permit the carriage to move past successive tabulator stops in a manner well known in the art. It will be noted that the position of the upper end of the tabulator arm 114 is such that the forward end of the link 231 automatically assumes an operative relation to the said tabulator arm when the frame unit is moved down over the action unit in the operation of assembling the two units. The tabulator arm is preferably beveled or curved at its upper end to facilitate the association of these parts.

*The carriage unit.*

The carriage unit as a whole comprises the carriage frame which, in the present instance, consists of end plates 237 and four bars 238, 239, 240, 241, extending between and rigidly secured to said end plates. A pair of marginal stops is adjustably mounted on the toothed bar 238; and a suitable number of tabular stops are adjustably mounted on the toothed bar 239. The bar 240 carries a plurality of ball bearings 242 which run upon a main guide rail 243 fixed to the frame unit and constitute the main support for the carriage. The novel features of the carriage per se form the subject matter of separate copending applications. The bar 238 carries a pair of rollers 244 which are positioned above and below the guide bar 245 fixed on the frame unit to support and guide the carriage.

The rack bar 156 which has heretofore been referred to as meshing with the escapement pinion 155 is carried by the lower ends of two arms 246 which are pivotally supported at 247 by end plates 237 of the carriage frame and are provided with an operating handle 248 whereby the bar may be manually swung out of engagement with the pinion 155. Springs 249 engaging the arms 246 tend to hold the rack bar 156 in mesh with said pinion 155. A bracket 250 secured to the bars 240 and 241 carries a series of arms 251 with feed rollers 252 on their ends which cooperate with a paper pan 253 and the platen 245 to feed the paper. This carriage forms the subject matter of a separate copending application and need be described herein only in so far as the relationship of the carriage unit as a whole to the frame unit is concerned. The mounting of the carriage unit on the frame unit to permit of ready detachment and replacement of the carriage unit is the feature which is pertinent to the present application.

The rear guide bar 245 on the framework has at both ends stops 255 and 256 (Fig. 4) to be engaged by one of the rollers 244 and limit the travel of the carriage at the extreme ends of its movement. The left hand stop 256 is so constructed and mounted that it may readily be moved out of operative position so as to permit of easy removal of the carriage from the left hand end of the machine. This stop in the present instance comprises a plate 257 (Fig. 11) which fits into a recess in the forward face of the bar 245 in either of two positions, to wit, with stop finger proper projecting upward in operative position or projecting outward from the end of the bar in inoperative position. The plate 257 is fixed upon one end of a plunger 258 which has at its opposite end a finger piece 259 for turning the plunger and plate. A coil spring 260 surrounding the plunger bears against the finger piece and holds the plate in either of its positions. The plate may be turned by pressing upon and then rotating the finger piece, the plate thereby being moved out of its recess so that rotation thereof will be possible.

When it is desired to remove the carriage unit from the machine the operator turns the stop 256 down out of its operative position, pushed rearwardly on the handle or lever 248 to disengage the rack 156 from the pinion 155, and rolls the carriage to the left until the marginal stop comes into engagement with the dog 224. He then pushes in on the margin release lever 233 to withdraw the dog 224 from the path of said stop, whereupon the carriage may be rolled further to the left until it is entirely disengaged from its guideways. As the carriage is withdrawn from its guideways the draw band 175 is automatically caught by the anchoring bracket 181 on the frame unit and detached from the carriage, and when the carriage is replaced it automatically picks up the draw band and removes the band from the anchoring bracket 181.

The flexibility of the base plate 30 of the action unit has heretofore been referred to as contributing to the proper correlation of certain parts on the various units. It is essential that the type guide 96, preferably also the ribbon guide and vibrator 123, be spaced the proper distance from the platen 254. From an inspection of Fig. 1, it will be seen that the proper correlation of these parts will result from the assembling of the units together, and that slight inaccuracies in the various dowel pins and recesses and guide means for locating the units will be compensated for by a yielding of the base plate 30 of the action unit. Inasmuch as the main carriage guide bar 243 bears a fixed relation to the vertical guides 38 on the frame unit, and the type bar segment (and consequently the type bar guide and ribbon vibrator) also bear a fixed relation to the posts 33 which enter these guides 38, the carriage when mounted upon the guide rail 243 will necessarily bear the proper relationship to the type guide and ribbon vibrator. The spacing of the type guide and the platen must be such as to allow free movement of the paper fingers and other parts which are mounted on the carriage in front of the platen.

From the foregoing description it will be understood that the machine may be quickly separated into the three main sections or units without the use of any tools whatsoever, the means for securing the units together being instantly operable by the fingers. The advantages of this construction are manifold, and accrue alike to the manufacturer, dealer and the user. Some of the advantages to the manufacturer are that the individual units may be separately assembled into complete form, being assembled into a complete machine as a final act. Production cost is greatly reduced by virtue of this feature since the assembly may be carried on much more rapidly (particularly in respect to the action unit) where the assembly work is done on relatively light units that can be easily handled and in which the parts are readily accessible to the workman. Damage to the finish on the frame unit which has heretofore commonly occurred during assembling operation is greatly reduced. Greater accuracy within a given amount of time can be attained in the assembling of the units and this is particularly important with respect to the action unit which must be very accurately assembled and carefully tested.

From the dealer's standpoint (assuming that the dealer is the one who repairs the machine from time to time) there is the very substantial advantage of facility in repairing due to the fact that the machine may be so readily separated into its units to permit of quick and convenient inspection and repair.

From the standpoint of the user, the machine has marked advantages among which may be mentioned the reduced cost of repairing, the extreme ease of cleaning the machine, and the vital fact that after long use of a machine a worn unit may be replaced with a new unit without necessitating the purchase of a complete new machine as is necessary with all typewriters now on the market. For example, the action unit which receives the hardest usage and greatest wear, may be replaced by a new unit at a relatively small cost compared to a complete new typewriter so that the user may effect a very great saving in maintenance of his typewriters by purchasing only such parts as are worn so badly as to need replacement.

I claim as my invention:

1. A typewriter having, in combination, an action unit arranged to rest upon a desk or other support, a frame unit comprising a main framework surrounding and enclosing said action unit and supported on the latter, a plurality of vertically disposed interengaging dowel pins and cooperating recesses on the respective units, a plurality of vertical posts of substantially the full height of said units, and a plurality of vertical bearings substantially co-extensive with said posts, said posts being mounted on one unit and said bearings on the other unit, said dowel pins, recesses, posts and bearings cooperating to insure proper relationship between the two units and permitting ready removal of the frame unit in a vertical direction without disturbing the action unit.

2. A typewriter having, in combination, an action unit comprising a supporting frame, a frame unit comprising a main framework completely surrounding said action unit and supported by the said supporting frame of said action unit carriage mechanism supported by said framework and operated by the action, and interfitting devices carried respectively by said two units and being separable in a vertical direction to permit the frame unit as a whole to be lifted out of association with the action unit without disturbing the latter.

3. A typewriter having an action unit comprising a horizontally disposed vertically flexible sheet metal base plate, operating mechanism thereon, a frame unit enclosing the operating mechanism and resting on the horizontal portion of the base plate, cooperating latch devices on the frame and base plate engageable to position the units in proper relation when assembled, and means to operate said latch devices.

4. A typewriter having, in combination, an action unit including a base plate, a frame unit enclosing said action unit and supported on the base plate, cooperating latch devices on the frame and base plate, and an operating member mounted on the base plate and connected to all of said latch devices to quickly engage or release the same.

5. A typewriter having, in combination, an action unit having a base plate, a frame unit enclosing said action unit and resting on the base plate, and finger operable means movably mounted on the base plate and detachably engageable with parts of the frame unit for latching the two units together.

6. A typewriter having, in combination, a unit including the major portion of the operating mechanism and a base plate and another unit comprising the main framework which substantially encloses the first unit, and instantly operable means on the base plate for locking said units together or for unlocking them to permit said framework to be lifted off the first mentioned unit.

7. A typewriter having, in combination, an action unit adapted to rest upon a desk or other support, a frame unit enclosing said action unit and supported thereon, said frame unit having headed fastenings and said action unit having movable locking devices which are instantly operable to engage or disengage said fastenings to lock the two units together or unlock them to permit of separation thereof.

8. A typewriter having, in combination, an action unit arranged to rest upon a desk or other support, a frame unit enclosing said action unit but readily separable therefrom and arranged to be passed downwardly over the action unit and be supported upon said action unit, a plurality of headed fastenings depending from the frame unit, a pair of slide bars on opposite sides of the action unit arranged to detachably engage said headed fastenings, a pair of levers each pivoted to one of said bars and extending toward the mid-portion of the action unit and a handle attached to the adjacent ends of said levers and arranged to be grasped by the operator for swinging said levers to move said bars.

9. A typewriter having an action unit comprising a base plate, in combination with a frame unit surrounding said action unit and resting upon said base plate, means to quickly latch said frame unit to said base plate, and carriage mechanism mounted on the frame unit, said action unit and carriage mechanism being provided with operating devices automatically engaging when the units are assembled.

10. A typewriter having, in combination, an action unit and a frame unit arranged to be readily separated and assembled, the frame unit surrounding and being supported by the action unit, ribbon vibrating and color shift mechanism mounted on the action unit, and finger-operable means mounted on the frame unit, said ribbon mechanism and said means being arranged to automatically assume an operative relation in the act of assembling the two units.

11. A typewriter having, in combination, an action unit and a frame unit arranged to be readily separated and assembled, the frame unit surrounding and being supported by the action unit, escapement mechanism on the frame unit, and a type bar actuated escapement yoke on the action unit, said escapement mechanism and said yoke being arranged to automatically assume an operative relation in the act of assembling the two units.

12. A typewriter having, in combination, an action unit and a frame unit arranged to be readily separated and assembled, the frame unit surrounding and being supported by the action unit, escapement mechanism mounted on the frame unit and a spacer bar actuated device on the action unit, said mechanism and said device being arranged to automatically assume an operative relation in the act of assembling the two units.

13. A typewriter having, in combination, an action unit and a frame unit arranged to be readily separated and assembled, the frame unit surrounding and being supported by the action unit, escapement mechanism mounted on the frame unit and escapement-operating mechanism mounted on the action unit, said two mechanisms being arranged to automatically assume an operative relation in the act of assembling the two units.

14. A typewriter having, in combination, an action unit and a frame unit arranged to be readily separated and assembled, the frame unit surrounding and being supported by the action unit, back spacing mechanism mounted on said frame unit, and a back spacer lever mounted on said action unit, said mechanism and said lever being arranged to automatically assume an operative relation in the act of assembling the two units.

15. A typewriter having, in combination, an action unit and a frame unit arranged to be readily separated and assembled, the frame unit surrounding and being supported by the action unit, tabulating mechanism mounted on the frame unit and a tabulator key lever mounted on the action unit, said mechanism and said key lever being arranged to automatically assume an operative relation in the act of assembling the two units.

16. A typewriter having a frame unit equipped with mechanism to be operated, in combination with an independent action unit having a device for operating said mechanism, said two units being capable of ready separation and association the frame unit surrounding and being supported by the action unit when assembled therewith, and said mechanism and said device being arranged to be moved out of and into operative relationship to each other in the act of separating and assembling said units.

17. A typewriter having a frame unit equipped with mechanism to be operated, in combination with an independent action unit having a device for operating said mechanism, said two units being capable of ready separation and association by a relative vertical movement of the units the frame unit surrounding and being supported by the action unit when asembled therewith, and said device and said mechanism having parts adapted to move out of and into operative juxtaposition automatically in the act of separating or associating said units.

18. A typewriter having a frame unit equipped with a plurality of mechanisms to be operated, in combination with an action unit having a plurality of devices each arranged to operate one of said mechanisms, said two units being constructed to be capable of ready separation and assembly the frame unit surrounding and being supported by the action unit when assembled therewith, and said mechanisms and devices being arranged to move out of and into operative juxtaposition in the act of separation or association of said units.

19. A typewriter having, in combination, an action unit arranged to rest upon a desk or like support, a frame unit arranged to enclose said action unit and be supported thereon, cooperating vertically disposed guide means on said two units arranged to permit of separation or assembly of the units in a vertical direction by moving the frame unit with reference to the action unit, quickly-operable means for locking said units together, an operating device on said action unit, and mechanism mounted solely on said frame unit and arranged to be actuated by said operating device, said mechanism comprising a part arranged to be moved out of or into operative juxtaposition to said device when said frame unit is withdrawn or assembled with said action unit.

20. A typewriter having, in combination, an action unit and a frame unit arranged to be readily separated and assembled, ribbon vibrating and color shift mechanism mounted on the action unit, and a pair of vertical movable plungers mounted on the frame unit at the front portion thereof and arranged to be operated by the writer's fingers to change the said ribbon vibrating mechanism, said mechanism and said plungers being brought into operative juxtaposition automatically in the act of assembling the two units.

21. A typewriter having, in combination, an action unit and a frame unit arranged to be readily separated and assembled, back spacing mechanism mounted on said frame unit and including a horizontal longitudinally shiftable bar, and a back spacer lever on said action unit having a part arranged to engage said bar for moving the latter, said bar and said lever being automatically moved into operative juxtaposition in the act of assembling the two units.

22. A typewriter having, in combination, an action unit and a frame unit arranged to be readily separated and assembled, tabulating mechanism mounted on the frame unit and including a longtitudinally shiftable bar, and a tabulator key lever mounted on the action unit and arranged to engage and operate said bar, said key lever and bar being automatically moved into operative juxtaposition in the act of assembling the two units.

23. A typewriter having, in combination, a sheet metal base plate with upstanding flanges at its sides and front edge, a pivot shaft mounted in said side flanges, a comb mounted on said front flange and a series of key levers mounted on said pivot shaft and guided by said comb.

24. A typewriter having, in combination, a sheet metal base plate with upstanding flanges at its sides and front edge, a pivot shaft mounted in said side flanges, a comb mounted on said front flange, a series of key levers mounted on said pivot shaft and guided by said comb, a transverse vertically disposed arcuate plate fixed to said side flanges above said key levers, a series of hanger brackets mounted on said plate, a series of bell cranks pivoted to said hanger brackets, a frame bracket fixed to said plate and carrying segment guides thereon, a shiftable type bar segment mounted in said guides, a series of type bars pivoted to said segment, and connections between said type bars and said bell cranks and between said bell cranks and said key levers.

25. A typewriter having, in combination, a sheet metal base plate with upstanding flanges on its sides, a pivot shaft mounted on said flanges, a series of key levers mounted on said shaft, an arcuate support mounted on said flanges above said key levers, a series of bell cranks mounted on said support and connected to said key levers, a series of type bars connected to said bell cranks, and a dust pan mounted on said side flanges of the base plate and overlying said key levers.

26. A typewriter having, in combination, a flat base plate, and an upstanding casting secured at its lower end to the base plate and carrying guides for type bar segments.

27. A typewriter having, in combination, a flat base plate, equipped with feet adapted to rest upon a desk or the like and support the typewriter, and an upstanding frame bracket secured at its lower end to the rear portion of said base plate and carrying guides for type bar segments.

28. A typewriter having, in combination, a carriage guiding rail, a carriage having a pair of rollers which embrace said rail, and a movable stop at one end of said rail, the stop being mounted to project transversely from said rail so as to obstruct said rolls or to lie parallel to said rail in inoperative position so as to permit said rolls to move off the end of said rail.

29. A typewriter having a guide rail, a carriage having rolls to lie above and below said rail, a stop plate fitting in a recess in the face of said rail at one end thereof, the stop plate being arranged to lie in said recess in operative position projecting transversely from said rail or inoperative position extending parallel to said rail, a stem passing through an opening in said rail and fixed on one end to said stop plate, a head on the other end of said stem, a coiled spring surrounding said stem and tending to move said stem in the direction to hold said stop plate in its recess, said stop plate being shiftable by pushing upon and then rotating said head.

30. A typewriter having, in combination, a carriage comprising an end plate with an aperture therein, a fixed bracket comprising two spaced vertical sides, a draw band having a hook to engage in the aperture in said carriage and having oppositely extending lugs to engage the sides of said bracket when the draw band lies between said sides.

31. A typewriter comprising, in combination, a support having guide rails thereon, a carriage mounted on said guide rails, means including a draw band for moving said carriage to the left, a bracket on said support adjacent to the draw band, a clip on the end of the draw band having means normally engaging said carriage arranged to engage said bracket when the carriage is removed to the left from said guide rails, and a shiftable stop mounted on one of said guide rails to permit such withdrawal of the carriage.

In testimony whereof, I have hereunto affixed my signature.

DE WITT C. HARRIS.